United States Patent
Swift et al.

(10) Patent No.: US 6,203,237 B1
(45) Date of Patent: Mar. 20, 2001

(54) APPARATUS FOR RELEASABLY CONNECTING FIRST AND SECOND STRUCTURES TOGETHER

(75) Inventors: Thomas R. Swift, Sun Valley; Peter A. Buck, Valencia; Edwin J Bresnik, Canoga Park; Gregory Peralta, Palmdale, all of CA (US)

(73) Assignee: Lockheed Martin Corporation, Palmdale, CA (US)

( * ) Notice: Subject to any disclaimer, the term of this patent is extended or adjusted under 35 U.S.C. 154(b) by 0 days.

(21) Appl. No.: 09/168,444

(22) Filed: Oct. 8, 1998

(51) Int. Cl.[7] ..................................................... F16B 21/06
(52) U.S. Cl. ........................................................ 403/322.3
(58) Field of Search ............................... 403/321, 322.1, 403/322.3, 329

(56) References Cited

U.S. PATENT DOCUMENTS

| | | | | |
|---|---|---|---|---|
| 2,499,712 | * | 3/1950 | Armstrong | 403/321 X |
| 2,942,903 | * | 6/1960 | Giladett | 403/321 X |
| 3,368,182 | * | 2/1968 | Culver | 403/329 X |
| 3,532,372 | * | 10/1970 | Stroud | 403/329 |
| 4,431,333 | | 2/1984 | Handler | 403/322 |
| 4,850,735 | * | 7/1989 | Hansen et al. | 403/329 X |
| 5,059,058 | * | 10/1991 | Charet et al. | 403/329 X |
| 5,364,046 | | 11/1994 | Dobbs et al. | 244/161 |
| 5,439,310 | * | 8/1995 | Evenson et al. | 403/321 |
| 5,520,476 | | 5/1996 | Marks et al. | 403/322 |
| 5,674,024 | * | 10/1997 | Castellon | 403/321 |
| 5,678,953 | * | 10/1997 | Usui et al. | 403/329 |
| 5,697,727 | * | 12/1997 | Harry | 403/321 X |
| 5,897,269 | * | 4/1999 | Ross et al. | 403/321 X |

* cited by examiner

Primary Examiner—Arthur Knight
Assistant Examiner—John R. Cottingham
(74) Attorney, Agent, or Firm—Robert A. Schruhl (57) ABSTRACT

The invention is an apparatus for releasably connecting a first structure to a second structure. In detail, the invention includes the first structure having a first cavity extending inward from a surface thereof. An inward facing circumferencial lip is mounted in the first cavity in proximity to the first surface forming a restricted opening having a first diameter. The second structure includes a second cavity extending inward from a surface of the second structure. A hollow tubular member having first and second ends is movably mounted within the second cavity, with the tubular member movable from a retracted position to an extended position. The first end of the tubular member is in the form of a collet movable between a retracted position and an expanded position in contact with the lip in the first cavity when the tubular member is in the extended position. An actuation system is provided for moving the tubular member between the retracted and extended positions wherein the collet extend past the lip of in the first cavity. A second actuation system is provided for locking the collet in the expanded position when the tubular member is in the extended position.

4 Claims, 7 Drawing Sheets

FIG.8

APPARATUS FOR RELEASABLY CONNECTING FIRST AND SECOND STRUCTURES TOGETHER

BACKGROUND OF THE INVENTION

1. Field of the Invention

The invention relates to the field of apparatus for releasably attaching expendable stores such as a fuel tank to a vehicle and the like and, in particular, to an apparatus that is quickly resettable.

2. Description of Related Art

There are numerous approaches to releasably connecting expendable stores to a vehicle. For example, wing mounted gravity released weapons are attached to the wings of aircraft by means of bomb racks that incorporate retractable hooks that engage lugs on the weapon and uses external adjustable sway braces to prevent lateral motion. The hooks can be either electro-mechanically or explosively actuated. However such apparatus are limited to small expendables. The use of such an approach on a large external fuel tank mounted to a spacecraft would require massive external sway braces that would add significant weight to the spacecraft and increase drag to unacceptable levels.

On large external fuel tanks explosively actuated systems such as explosive bolts and the like have proven highly reliable, but require refurbishment after each use. In addition, during the installation of pyrotechnic devices, concurrent activities are severely restricted, increasing the overall "turnaround" time between launches. For example, U.S. Pat. No. 5,520,476 "Tie-Down And Release Mechanism For Spacecraft" by C. W. Marks, et al. discloses such an explosively actuated device. It includes a hollow housing mounted within the main body of the spacecraft having an internal lip at its end that abuts against an internal lip on a second hollow housing on the structure to be released. A segmented collet, having an external groove, is held in contact with the two lips such that they are retained within the groove. The collet in turn is held into contact with the lips by a toroidal spring supported by a movable cylinder. This cylinder includes a second groove positioned such that when the movable cylinder is actuated by the pyrotechnic charges, it drives the cylinder to a position where the spring can retract into the second groove thereon allowing the segmented collet to release the lips. Such explosively actuated systems can not be used on vehicles that require multiple dockings with another spacecraft because of the refurbishment requirement after each use. In the future, reusable booster spacecraft will require rapid turn around times and thus such vehicles must have only a minimum number of systems requiring refurbishment between launches.

U.S. Pat. No. 4,431,333 "Apparatus For Releasably Connecting First and Second Objects in Predetermined Space Relationship" by J. A. Chandler and U.S. Pat. No. 5,364,046 "Automatic Compliant Capture And Docking Mechanism For Spacecraft" by M. E. Dobbs, et al. disclose apparatus for connecting a spacecraft to another spacecraft. Here one of the vehicles includes an extendable probe having a bulb-like member at its end which engages a cone shaped funnel on the spacecraft. Upon the bulb like member bottoming in the funnel, a releasable detente secures the probe therewithin. Such systems, have the advantage of correcting for misalignment of the two vehicles during docking because the funnel tends to "capture" the probe. However, they are unusable for securing an expendable tank or the like to a launch vehicle. First of all, the need to accommodate misalignment is not required and the tank must be firmly secured to the booster in order to withstand the high aerodynamic and inertial G loads experienced by boosters. In addition, they do not provide means for adjusting the tension preload between the spacecraft nor are such systems retractable to a flush condition.

Thus, it is a primary object of the invention to provide an apparatus for releasably connecting first and second structures together, such as a reusable launch vehicle and an expendable external tank.

It is another primary object of the invention to provide an apparatus for releasably connecting first and second structures together that requires no refurbishment after operation.

It is a further object of the invention to provide an apparatus for releasably connecting first and second structures together that includes means to adjust the tension preload.

It is a still further object of the invention to provide an apparatus for releasably connecting first and second structures together that returns to a flush position within the external contour of the structure.

SUMMARY OF THE INVENTION

The invention is an apparatus for releasably connecting a first structure to a second structure such as a spacecraft and expendable fuel tank. In detail, the invention includes the first structure having a first cavity extending inward from an external surface thereof. The first cavity incorporates an inward facing circumferencial lip in proximity to the first surface thus forming a restricted opening therein.

A second cavity is located in the second structure that extends inward from an external surface thereof. A hollow tubular member is movably mounted within the second cavity and incorporates a collet at a first end. When the two structures are positioned for joining the cavities are aligned and in proximity to each other. The tubular member is movable between a retracted position flush or recessed within the second cavity to an extended position wherein the collet on the first end extends into the first cavity. The collet includes a plurality of longitudinal slots extending from the first end partially along the tubular member toward the second end forming a plurality of finger-like members in the form of very stiff leaf springs. In one embodiment, the plurality of fingers is bent radially inward forming a segmented generally truncated conical surface. The fingers include radially outward directed protrusions at the first end of the tubular member forming a segmented circular ring having a diameter smaller than the diameter of the restricted opening of the lip in the first cavity (the retracted position of the collet).

A shaft having first and second ends is slidably mounted within the tubular member and is movable between a retracted position to an extended position wherein in the first end is engagable with the fingers of the collet. When the tubular member and shaft are in the extended positions, the shaft forces the fingers, which are biased toward the retracted position, from the retracted position to the expanded position such that the protrusions have a diameter greater than the diameter of the circumferential lip locking the first and second structures together.

In a second embodiment, the fingers are straight and biased toward the expanded position, and the diameter of the protrusions is greater than the diameter of the restricted opening in the first cavity (expanded position). In this embodiment, when the tubular member is moved to the extended position, the fingers are compressed inward to the retracted position as the protrusions pass through the restricted opening in the lip and thereafter expand the expanded position. Thereafter, when the shaft, is moved to the extended position, it locks the protrusions in engagement with the lip.

A first actuator assembly is coupled to the tubular member for moving it from the retracted position to the extended position. Preferably, the fist actuator assembly includes the tubular member having external threads in proximity to the second end. A first nut having internal threads engages these external threads and further has external spines. An electric motor operating through a gear reduction assembly is coupled to the splines of the first nut for rotating the nut clockwise and counterclockwise such that the tubular member is driven between the retracted and extended positions. Furthermore, once the shaft and tubular member are in the extended positions and the first and second structures are locked together, the electric motor, operating through the gear reduction assembly, can be used to adjust the tension load therebetween.

A second actuator assembly is included for moving the shaft between the retracted and extended positions. Preferably, the second actuator assembly includes the shaft having external threads in proximity to the second end thereof. A second nut having internal threads engages these external threads on the shaft and further has external spines. A second electric motor operating through a gear reduction assembly is coupled to the spines on the second nut for rotating the nut clockwise and counterclockwise such that the shaft is driven between the retracted and extended positions.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

DESCRIPTION OF THE PREFERRED EMBODIMENT

Figure 1:
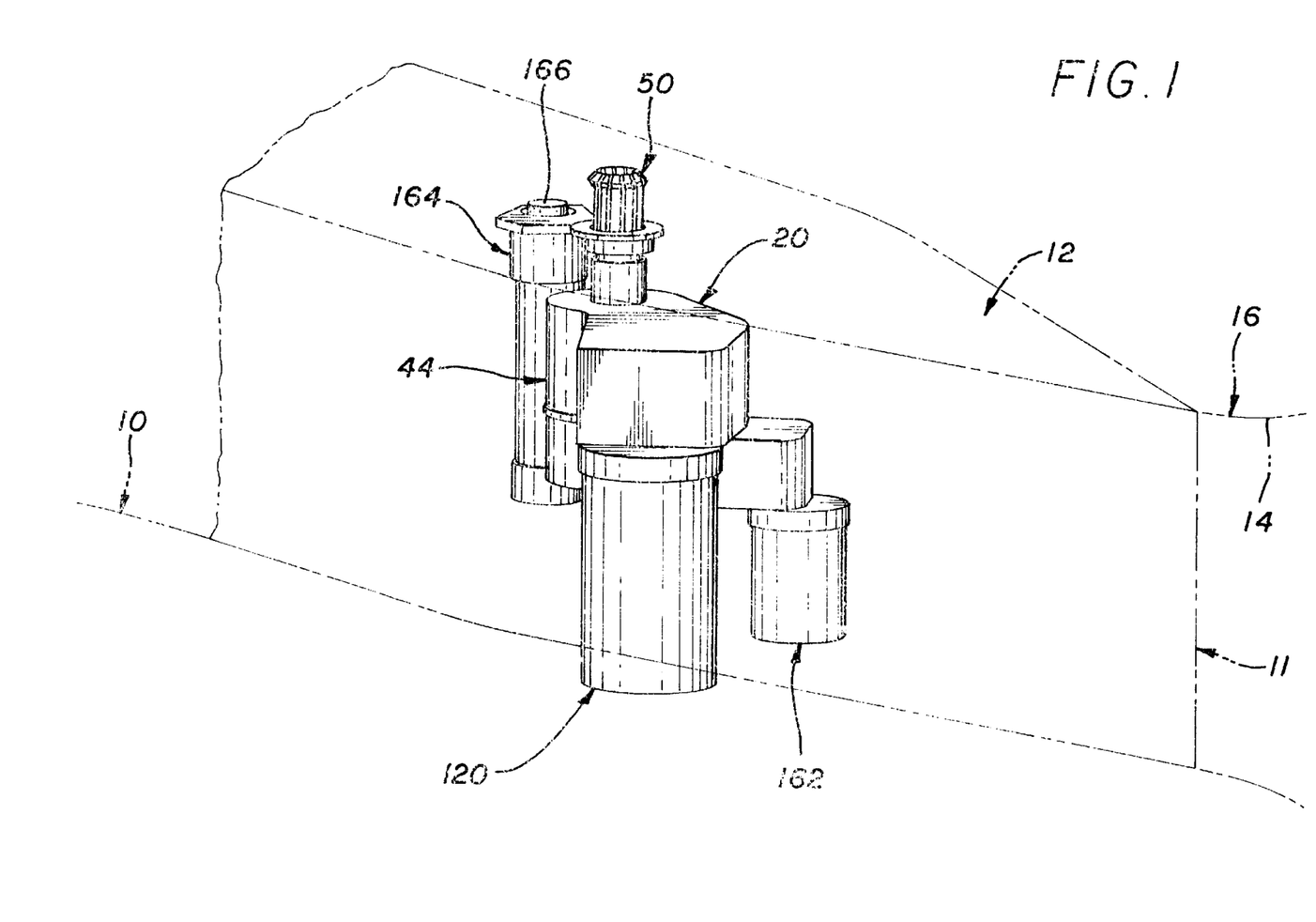
FIG. 1 is a partial perspective view of a spacecraft booster with a pylon mounted expendable external fuel tank mounted thereon with the apparatus shown mounted in the pylon.
Figure 2:
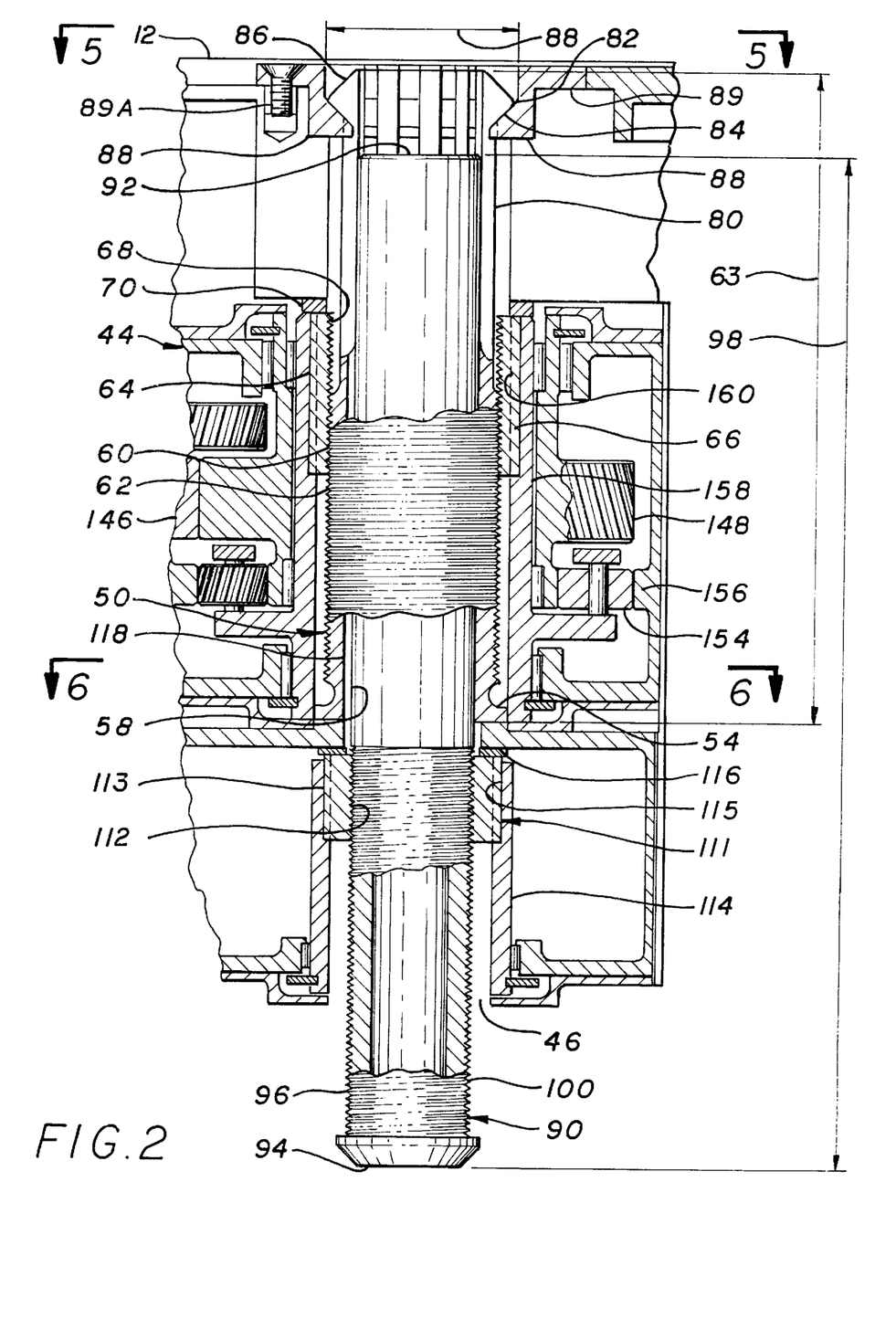
FIG. 2 is a partial cross-sectional view of the apparatus shown in FIG. 8 taken along the line 2—2 illustrating the collet assembly in the retracted position.
Figure 3:
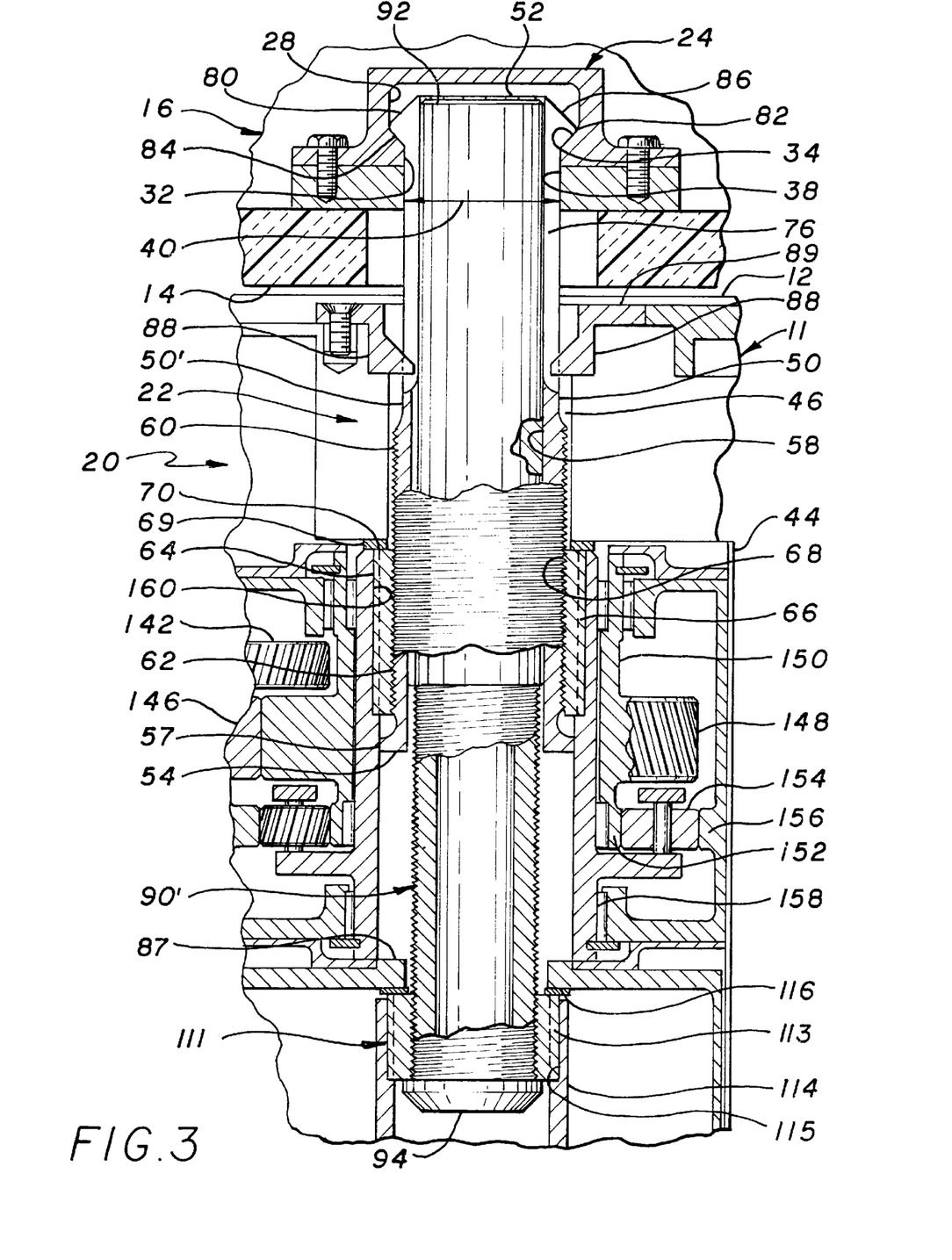
FIG. 3 is a view of the apparatus shown in FIG. 2 illustrating the collet assembly in the extended position attaching an expendable fuel tank to the spacecraft.

Illustrated in FIGS. 1–3 is a partial view of a structure, such as a spacecraft booster, generally indicated by numeral 10. The booster includes a pylon 11 having an external surface 12 for receiving an external surface 14 of an expendable structure such as an external tank 16. The apparatus, generally indicated by numeral 20, includes a collet assembly 22 mounted within the pylon 11 and a receptacle assembly 24 mounted in the tank 16. The receptacle assembly 24 includes a cavity 28 extending from the surface 14. Mounted in the cavity 28, preferable flush or, as illustrated, in proximity to the surface 14, is a radially inward directed lip 32 having inner chamfered surface 34 forming a reduced opening 38 with a diameter indicated by numeral 40.

The collet assembly 22 includes a housing 44 mounted in proximity to the surface 12 and which is in communication with cavity 46. The collect assembly 22 also includes a hollow tubular member 50 having first and second ends 52 and 54, respectively. The tubular member 50 includes a flange 57 on its second end 54, an internal bore 58 and an external surface 60 with external threads 62 extending partially along its length from the flange 57. A nut 64 with external splines 66 includes internal threads 68 engaged with the external threads 62 on the tubular member 50. Thus rotation of the nut 64 clockwise and counterclockwise will translate the tubular member 50 between the retracted position wherein it is flush or below the surface 12 to an extended position 50' wherein the second end extends through the opening 38 and past the lip 32 in the cavity 28. The nut 64 is restrained from translating along the cavity 46 toward the first end 52 of the tubular member 50 by means of a thrust washer 69 abutting a shoulder 70 in the housing 44.

Figure 5:
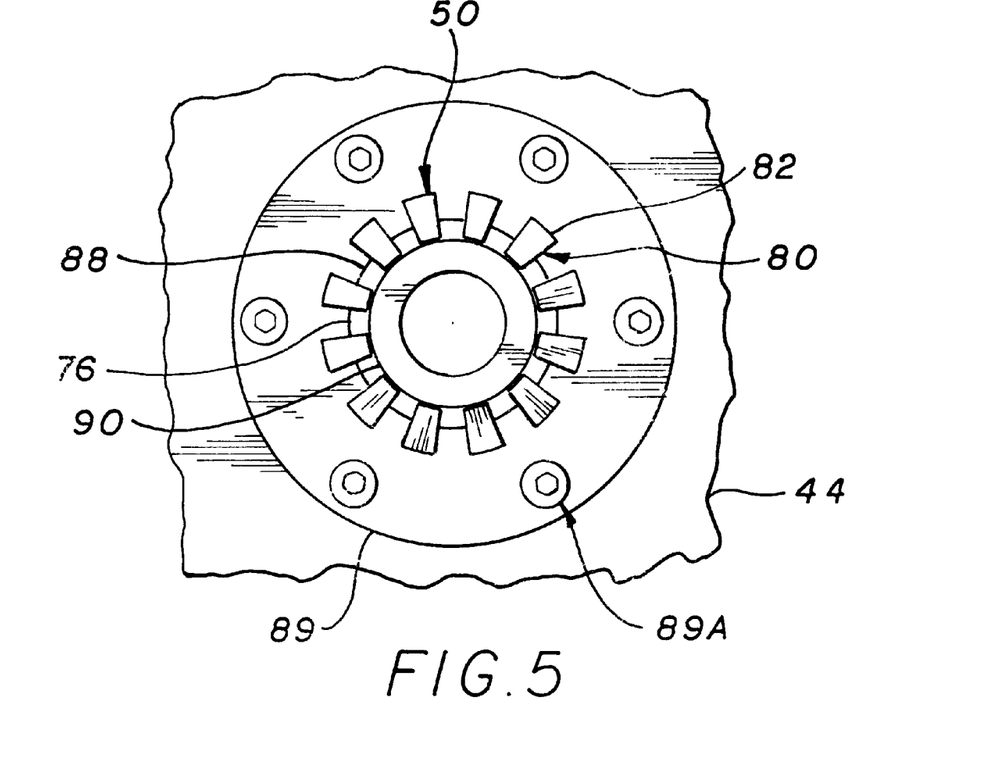
FIG. 5 is a cross-sectional view of FIG. 2 taken along the line 5—5 illustrating the method of preventing rotation of the collet assembly.

Still referring to FIGS. 1–3 and, additionally to FIG. 5, the tubular member 50 further includes a plurality of radially extending slots 76 extending partially along its length from the first end, forming a plurality of fingers 80. It should be noted that the tubular member is preferably made of a high strength material such as a Titanium alloy, however the fingers 80 are long and thin enough such that movement under appropriate force is possible. Thus the fingers 80 act as leaf springs biased toward the expanded position. Mounted on the end of the fingers 80 are radially outward directed protrusions 82 that include chamfered surfaces 84 and 86. The outside diameter 88 of the protrusions is slightly greater than the opening 40 of lip 32 (the expanded position). Thus when the tubular member 50 is moved from the retracted position to the extended position 50', the chamfered surface 86 of the protrusions 82 when contacting the lip 32 cause the fingers 80 to bend inward to a retracted position. When the protrusions 82 pass the lip 32 they "pop" back outward to their original expanded position. The surfaces 84 are chamfered such that they will mate with the chamfered surface 34 of the lip 32, when the tubular member 50 is in the extended position 50'. The tubular member 50 is prevented from moving past the retracted position by the protrusions 82 coming into contact with tangs 88 attached to a mounting plate 89 secured to the housing 44 by screws 89A. The tubular member 50 is prevented from moving past the extended position by the flange 57 coming into contact with the nut 64. The tangs 88 also prevent rotation of the tubular member 50 because they extend into the slots 76 and contact the fingers 80.

Figure 6:
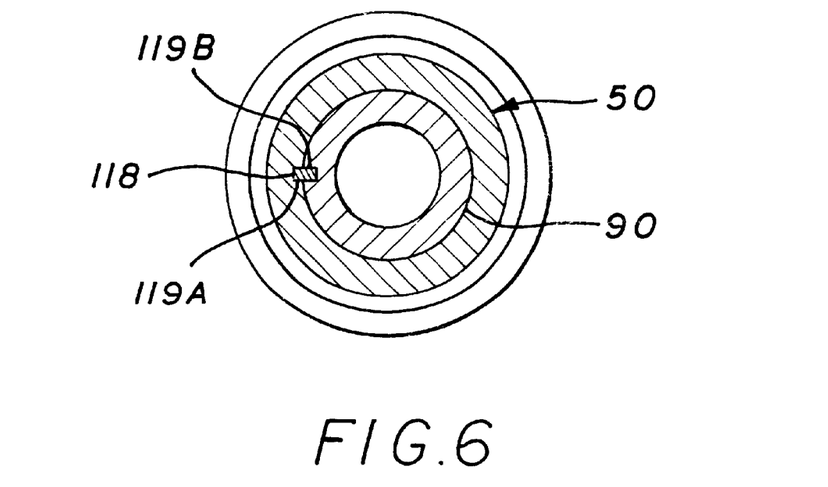
FIG. 6 is a cross-sectional view of FIG. 2 taken along the line 6—6 illustrating the method of preventing rotation of the shaft used to expand the collet.

Referring back to FIGS. 2 and 3, and additionally to FIG. 6, a shaft 90 having a first end 92 and second end 94, and an external surface 96 is slidably mounted within the internal bore 58 of the tubular member 50. The shaft 90 has a length 98 greater than the length 63 such that when it is in the retracted position and the tubular member 50 is in the extended position, the first end 92 does not engage the fingers 80. When the shaft 90 is in the extended position, indicated by numeral 90', the first end 92 extends to the first end 52 of the tubular member 50 expanding the fingers 80 such that the diameter 168 of the protrusions 82 is greater than that of the diameter 40 of the opening 38 of the cavity 28 (the expanded position). The shaft 90 also includes external threads 100 in proximity to the second end 94 extending partially along the external surface 96.

A nut 111 having internal threads 112 engaged with the external threads 100 on the tubular member 90 and also includes external splines 113. Thus rotation of the nut 111 clockwise and/or counterclockwise translates the shaft 90 between the retracted position and extended position 90'. A hollow shaft 114, having internal splines 115 in engagement with the external splines 113 on the nut 111, is rotatably mounted in the housing 44. The nut 111 is restrained from translating along the cavity 46 by the end of the splines 115 on the shaft 114 and the thrust washer 116 abutting the flange 87. Referring to FIG. 6, the shaft 90 is prevented from rotating by means of a key 118 mounted in a hole 119A in the tubular member 50 and slidably engaging slot 119B in the shaft 90.

Figure 4:
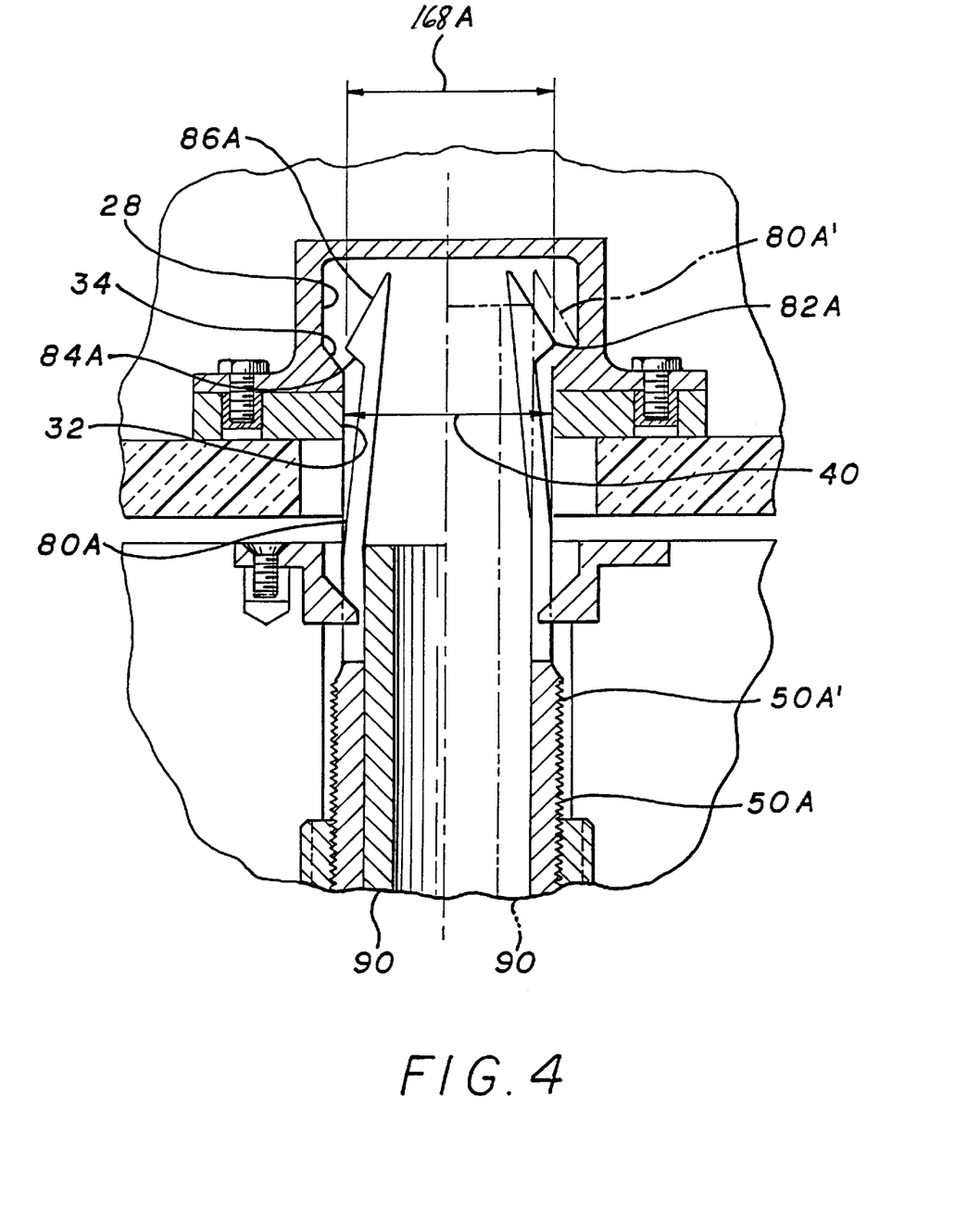
FIG. 4 is a partial view of the apparatus shown in FIG. 3 illustrating an alternate embodiment of the apparatus.

FIG. 4 presents a partial view of an alternate version of the tubular member 50, indicated by numeral 50A. The tubular member 50A also includes a plurality of fingers 80A. The fingers 80A are bent inward such that they generally form a segmented truncated cone and biased to this position. Mounted on the end of the fingers 80A are radially outward directed protrusions 82A that include chamfered surfaces 84A and 86A. The outside diameter 168A of the protrusions is slightly less than the diameter 40 of lip 32 in this retracted position. The surfaces 84A are chamfered such that they will mate with the chamfered surface 34 of the lip 32, when the tubular member 50A is in the extended position 50A'. When the fingers 80A are moved to the expanded position, indicated by numeral 80A', when the shaft 90 is moved to the extended position.

Figure 7:
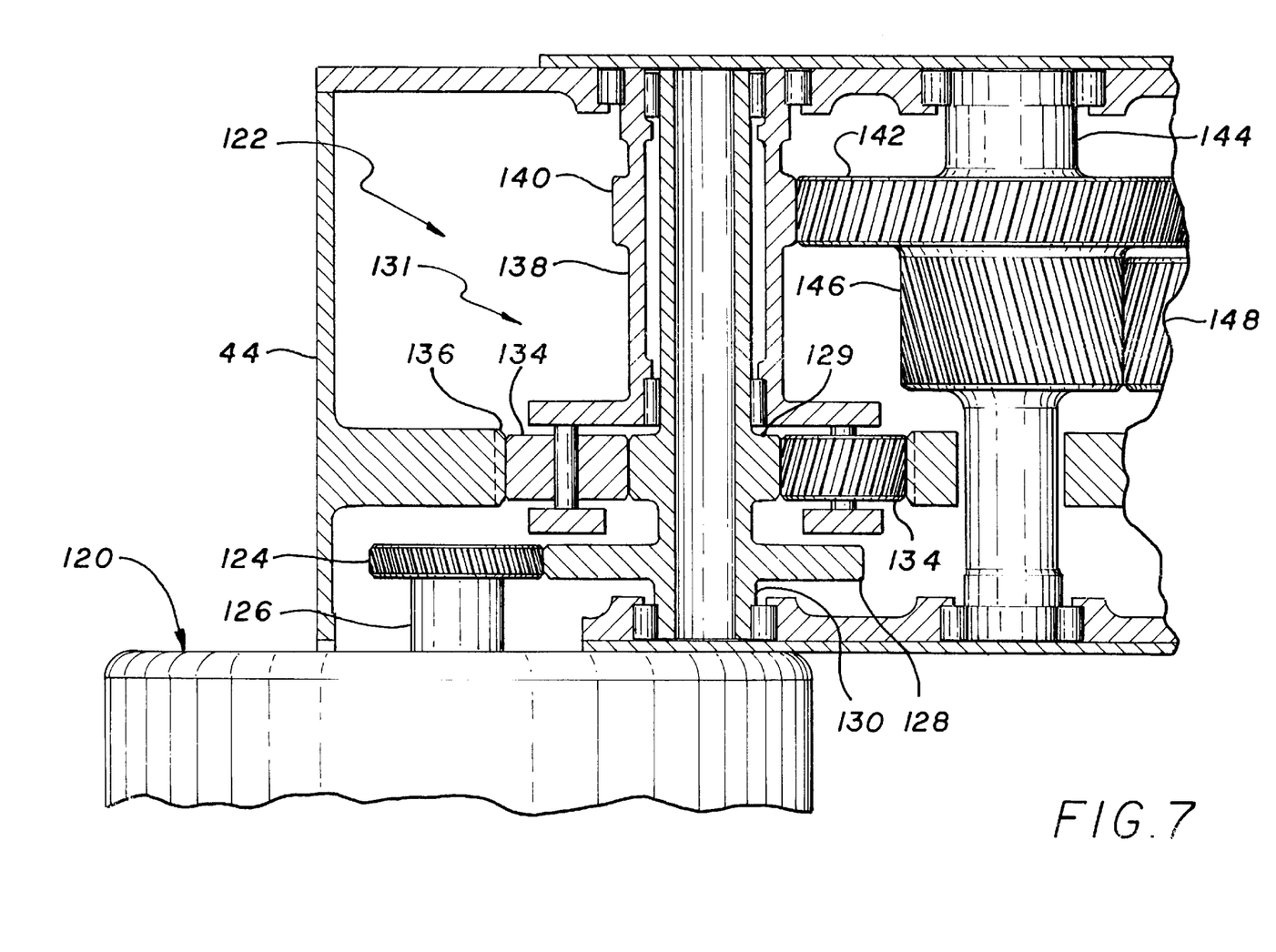
FIG. 7 is a partial cross-sectional view of the apparatus shown in FIG. 8 taken along the line 7—7 illustrating the gear reduction assembly coupling a electric motor to the collet assembly.
Figure 8:
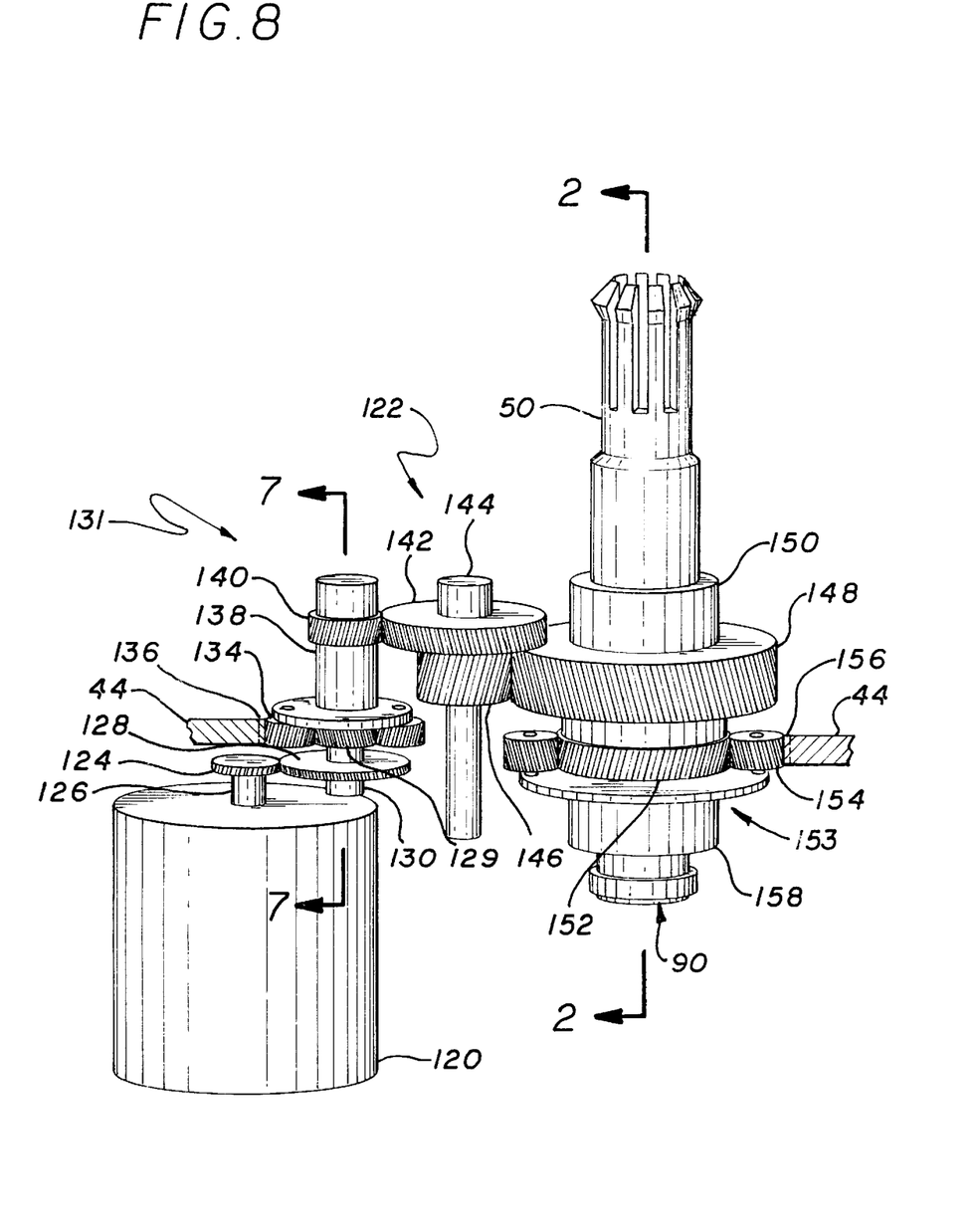
FIG. 8 is a semi-schematic view of the gear reduction assembly illustrated FIGS. 2, 3, and 7.

Still referring to FIG. 3 and additionally to FIGS. 7 and 8, mounted to the housing is a reversible electric motor 120 coupled to a gear reduction assembly, generally indicated by numeral 122. The gear assembly includes gear 124 mounted to the motor output shaft 126. The gear 124 engages a gear 128 rigidly mounted on a shaft 130 that is rotatably mounted in the housing 44. A gear 129 is also mounted on the shaft 130 that acts as a sun gear to a first planetary gear assembly 131 The planet gear assembly 131 includes planet gears 134 and ring gear 136 secured to the housing 44. The planet gears 134 drive a shaft 138 also rotatably mounted in the housing 44. A gear 140 is mounted on the shaft 138 and drives gear 142 rigidly mounted on a shaft 144 that is rotatably mounted in the housing 44. A gear 146 is rigidly mounted on the shaft 144 and drives gear 148 rigidly mounted on shaft 150 rotatably mounted in the housing 44. A sun gear 152, of a second planetary gear assembly 153, is rigidly mounted on the shaft 150 and engages the planet gears 154 that rotate about a ring gear 156 rigidly mounted to the housing 44. The planet gears 154 are mounted on a shaft 158 rotatably mounted in the housing 44 that includes internal splines 160 that engage the external splines 66 on the nut 64. The end of the internal splines 160 prevent the nut 64 from translating toward the second end 54 of the tubular member 50 when the nut is rotated.

Such a planetary gear system is necessary in order to obtain the necessary gear reduction ratios necessary to allow the torque of the motor 120 to be sufficiently amplified to drive the tubular member 50. However, such a gear reduction system might not be necessary if hydraulic motors where used or the tubular member 50 and shaft were directly actuated by hydraulic pressure. Referring back to FIGS. 1 and 3, a second reversible electric motor 162 is also mounted to the housing 44. A second gear assembly mounted is within the housing 44 (not shown except for the shaft 118 shown in FIG. 3 similar to shaft 158 shown in FIGS. 2 and 3) similar to gear assembly 122, is used to drive the nut 111 that moves the shaft 90. Thus after the external fuel tank 16 is mated to the pylon 11 and the tubular member 50 and shaft 90 are moved to the extended positions, the electric motor 120 can be used to adjust the tension load applied by the collet assembly 22 to the lip 32.

A hydraulically or pneumatically actuated ejector assembly 164 having a piston rod 166 can be incorporated in the pylon 11 in proximity to the apparatus 20 to eject the fuel tank 16 from the booster 10. It is envisioned that on large structures, such a booster fuel tanks, more than one apparatus may be necessary to properly secure the tank. Thus the advantages of the apparatus are clear: the apparatus requires no refurbishment after operation; the tension preload is adjustable because of the use of electric motors and a planetary gear system; it can return to a flush position within the external contour of the structure after separation of the structure; and it does not require refurbishment after use.

While the invention has been described with reference to a particular embodiment, it should be understood that the embodiments are merely illustrative as there are numerous variations and modifications which may be made by those skilled in the art. Thus, the invention is to be construed as being limited only by the spirit and scope of the appended claims.

Industrial Applicability

The invention has applicability primarily to the spacecraft industry.

What is claimed is:

1. An apparatus for releasably connecting a first structure to a second structure, comprising:
   a first cavity within the first structure extending inward from a first surface thereof, said first cavity having an inward facing circumferencial lip in proximity to the first surface forming a restricted opening having a diameter, said lip having a chamfered surface facing inward toward said first cavity;
   a second cavity within the second structure extending from a second surface therein;
   a hollow tubular member having first and second ends mounted in said second cavity movable between a retracted position and an extended position, said first end of said tubular member comprising a collet, said collet engagable with said lip when said tubular member is in said extended position and said collet is in an expanded position;
   first means for moving said tubular member between said retracted and extended positions, said first means including a first nut having internal threads engaged with said external threads on said tubular member;
   means to rotate said first nut clockwise and counterclockwise and locking means for preventing said first nut from translating along said external surface of said tubular member when said first nut is rotated;

said second end of said tubular member having a plurality of longitudinal slots forming a plurality of fingers, said fingers movable between a retracted position to an expanded position, said plurality of fingers having radially outward directed protrusions attached thereto at said first end of said tubular member, said protrusions having a chamfered surface facing away from said first end of said tubular member;

second means for locking said collet in engagement with said lip, said second means includes a shaft having first and second ends slidably mounted within said tubular member, said shaft movable between a retracted position and an extended position wherein said shaft is engageable with said fingers forcing said fingers to said expanded position and locking said fingers in said position and maintaining said diameter of said protrusions greater than the diameter of said restricted opening of said first cavity;

said chamfered surfaces of said lip and said protrusions adapted to mate together when said tubular member and said shaft are in their said respective extended positions, locking the first and second structures together; said protrusions forming a segmented ring having a diameter less than the diameter of said restricted opening when said fingers are in said retracted position and greater than said diameter of said restricted opening when said fingers are in said expanded position, said plurality of fingers are bent radially inward forming a generally segmented truncated cone like shape when said fingers are in said retracted position;

said fingers are in the form of leaf springs biased toward said expanded position such that as said tubular member is moved from said retracted position to said expanded position, said fingers are moved from said expanded condition to said retracted position as the protrusions contact said lip such that said diameter of said protrusions is smaller than said diameter of said restricted opening and, once past said lip, said fingers return to said expanded position wherein said diameter of said protrusions is again greater than said diameter of said restricted opening.

2. The Apparatus as set forth in claim 1 wherein said second means comprises:

said shaft having external threads along a portion thereof from the second end to said first end; and a second nut having internal threads in engagement with said external threads of said shaft;

means to rotate said second nut clockwise and counterclockwise; and locking means for preventing said second nut from translating along said external surface of said tubular member as said second nut is rotated.

3. The Apparatus as set forth in claim 1 wherein:

said first nut includes external splines; and said means to rotate said first nut includes a first electric motor assembly including a gear reduction assembly coupled to said splines on said first nut.

4. The Apparatus as set forth in claim 2 wherein:

said second nut includes external splines; and said means to rotate said second nut includes a second electric motor assembly including a gear reduction assembly coupled to said splines on said second nut.

* * * * *

UNITED STATES PATENT AND TRADEMARK OFFICE
CERTIFICATE OF CORRECTION

PATENT NO. : 6,203,237 B1
DATED : March 20, 2001
INVENTOR(S) : Thomas R. Swift et al.

It is certified that error appears in the above-identified patent and that said Letters Patent is hereby corrected as shown below:

<u>Column 1,</u>
Line 4, insert the following:
-- Statement of Government Interest
The invention was made with Government support under contract F29601-97-C-0136, awarded by the The Department of the Air Force. The U.S. Government has certain rights in this invention. --

Signed and Sealed this

Twenty-eighth Day of December, 2004

JON W. DUDAS
*Director of the United States Patent and Trademark Office*